United States Patent

Sato et al.

[11] Patent Number: 5,415,267
[45] Date of Patent: May 16, 1995

[54] METHOD AND APPARATUS FOR ORIENTING ARTICLES

[75] Inventors: Atsushi Sato, Tochigi; Takao Ishikawa, Ibaraki; Shinichi Endo, Chiba; Toshiyuki Ohmori, Chiba; Yasuaki Kotani, Chiba, all of Japan

[73] Assignees: KAO Corporation, Tokyo; Shibuya Kogyo Co., Ltd., Ishikawa, both of Japan

[21] Appl. No.: 176,311

[22] Filed: Jan. 3, 1994

Related U.S. Application Data

[63] Continuation of Ser. No. 889,066, May 26, 1992, abandoned.

[30] Foreign Application Priority Data

Sep. 30, 1991 [JP] Japan .................. 3-276477

[51] Int. Cl.$^6$ ............................................. B65G 47/24
[52] U.S. Cl. ............................................. 198/380
[58] Field of Search .................. 198/380; 414/755

[56] References Cited

U.S. PATENT DOCUMENTS

| | | | |
|---|---|---|---|
| 3,200,968 | 8/1965 | Gaddini | 198/380 X |
| 3,578,813 | 5/1971 | Ruscitti . | |
| 3,623,595 | 11/1971 | Brown | 198/380 |
| 3,889,591 | 6/1975 | Noguchi | 198/380 X |
| 4,995,779 | 2/1991 | Müller | 198/380 X |
| 5,031,748 | 7/1991 | Bianchini et al. | 198/380 |

FOREIGN PATENT DOCUMENTS 55-58521 4/1980 Japan .
57-36207 8/1982 Japan .

OTHER PUBLICATIONS

Patent Abstracts of Japan, vol. 4, No. 37 (M-4)(519), 27 Mar. 1980, and JP-A-55 011 476 (EFU AI TEI), 26, Jan. 1980.
Soviet Inventions Illustrated, Section PQ, Week 8806, 11 Feb. 1988, Derwent Publications Ltd., London, GB; AN 88-041455, and SU-A-1 320 140 (Voron Tech Inst), 30 Jun. 1987.

*Primary Examiner*—Cheryl L. Gastineau
*Attorney, Agent, or Firm*—Dvorak and Traub

[57] ABSTRACT

An article orienting method and apparatus to effectively orient articles fed in random fashion into substantially uniformly oriented condition. The apparatus includes a vertical passage, into which the articles are put in desired order. Upwardly directed fluid flow is generated in the vertical passage, which fluid flow acts on the article within the passage to maintain the article in the floating condition with capability of free rotation. By the effect of the fluid flow, the articles put in random attitude adjusted and oriented in a uniform direction. After completion of orientation, the fluid flow is terminated for removing the oriented articles in oriented condition.

4 Claims, 11 Drawing Sheets

METHOD AND APPARATUS FOR ORIENTING ARTICLES

This application is a continuation of application Ser. No. 07/889,066, filed May 26, 1992, abandoned.

BACKGROUND OF THE INVENTION

1. Field of the Invention

The present invention relates to a method and apparatus for orienting or positioning articles, as for examples, parts, and materials and the like.

2. Description of the Related Art

Conventional methods and apparatus for orienting articles have been disclosed in Japanese Examined Patent Publication (Kokoku) No. 57-36207 and Japanese Unexamined Utility Model Publication (Kokai) No. 55-58521, for example.

In brief discussion of the prior art, Japanese Examined Patent Publication No. 57-36207 discloses an apparatus for orienting articles, in which is provided means for generating fluid flow velocity distribution having lower flow velocity at the center portion and higher flow velocity at the portion near fluid flow passage walls. The fluid flow in the fluid flow passage acts on the articles within the passage to stabilize the attitude of the articles. The disclosed apparatus comprises a fluid flow passage, in which the articles to be oriented travel with free rotation, a fluid flow resistor arranged upstream of the fluid flow passage and having greater resistance value at the center portion and smaller resistance value at peripheral portion, and a fluid source arranged upstream of the fluid flow resistor. With such construction, the flow having the lower flow velocity at the central position and the higher flow velocity at the portion near the fluid flow passage wall can be generated.

On the other hand, Japanese Unexamined Utility Model Publication No. 55-58521 discloses a ventilated pneumatic orienting element which has an orienting pipe which permits free rotation of articles to be oriented, an appropriate number of orienting nozzles opening to the periphery of the orienting pipe, a transporting pipe for conveying the work with restricting rotation thereof, an appropriate number of transporting nozzles opening into the transporting pipe, and an appropriate number of bends opening into a contraction pipe and the transporting pipe and located upstream of the transporting nozzles.

However, the above-mentioned prior art has the disadvantages set out below.

The orienting method and apparatus for articles to be oriented, disclosed in Japanese Examined Patent Publication No. 57-36207 or the ventilated pneumatic orienting elements disclosed in Japanese Unexamined Utility Model Publication No. 55-58521 can orient the articles substantially in a uniform direction by interaction of the flow of the fluid and the articles to be oriented or workpieces. However, these publication do not teach or disclosure how to take out articles substantially oriented in a uniform direction.

Therefore, it is an object of the present invention to provide a method and an apparatus for orienting articles which can regulate attitude or position of randomly supplied articles using flow of upward fluid flow and can remove the oriented articles with regulated attitude or position.

SUMMARY OF THE INVENTION

A method for orienting articles, according to the present invention, comprises the steps of:

introducing articles into an upwardly directed fluid flow;

terminating or decelerating upwardly directed fluid flow after orienting the articles in substantially predetermined direction; and removing the articles to a predetermined position while maintaining oriented condition.

An apparatus for orienting articles, according to the present invention, comprises:

a vertical passage for passing the articles which are in free rotation;

an article receptacle station located below the vertical passage for receiving articles which are oriented in substantially predetermined direction through the vertical passage; and a pressurized fluid injecting station provided below the article receptacle station for injecting pressurized fluid into the vertical passage.

Preferably, the article receptacle station is arranged on a rotary body.

Alternatively, a method for orienting articles, comprises the steps of:

putting articles into an upwardly directed fluid flow;

terminating or decelerating upwardly directed fluid flow after orienting the article in substantially predetermined direction;

drawing the oriented articles onto an article holding station;

reversing the article holding station while maintaining drawing of the oriented article; and releasing the drawing force for transferring the article in the reversed oriented condition to an article transferring member.

Also, an alternate apparatus for orienting articles comprises:

a passage forming body defining a vertical passage for passing articles which are in free rotation;

an upwardly directed fluid flow generating device for generating upwardly directed fluid flow within the vertical passage of the passage forming body;

an article holding station provided below the passage forming body for drawing the article oriented in substantially a predetermined direction through the vertical passage of the passage forming body for retaining, and subsequently releasing the drawing force;

a reversing device for reversing the article holding station; and an article transferring member for receiving the reversed oriented article from the article holding station situated in the reversed condition upon releasing the drawing force.

It should be noted that the article may be a cap and the upwardly directed fluid flow may be an upwardly directed air flow.

The present invention operates as follows:

(1) The articles are fed in random attitude, and their attitude is oriented in substantially uniform direction while they are held in floating condition by the effect of the upwardly directed pressurized air flow, and they are stabilized at the regulated attitude. By termination or reduction of the upwardly directed air flow, the articles fall vertically while maintaining the regulated attitude. Then, the article is held on the article holding station by applying drawing force.

(2) Thereafter, the article holding station holding the article is reversed. Subsequently, the drawing force is released to permit the article to fall down from the article holding station and to be transferred to the article transferring member with reversed regulated attitude.

BRIEF DESCRIPTION OF THE DRAWINGS

The present invention will be understood more fully from the detailed description given herebelow and from the accompanying drawings of the preferred embodiments, which, however, should not be taken to limit the invention, but are for explanation and understanding only.

In the drawings.

DESCRIPTION OF THE PREFERRED EMBODIMENTS

Figure 1:
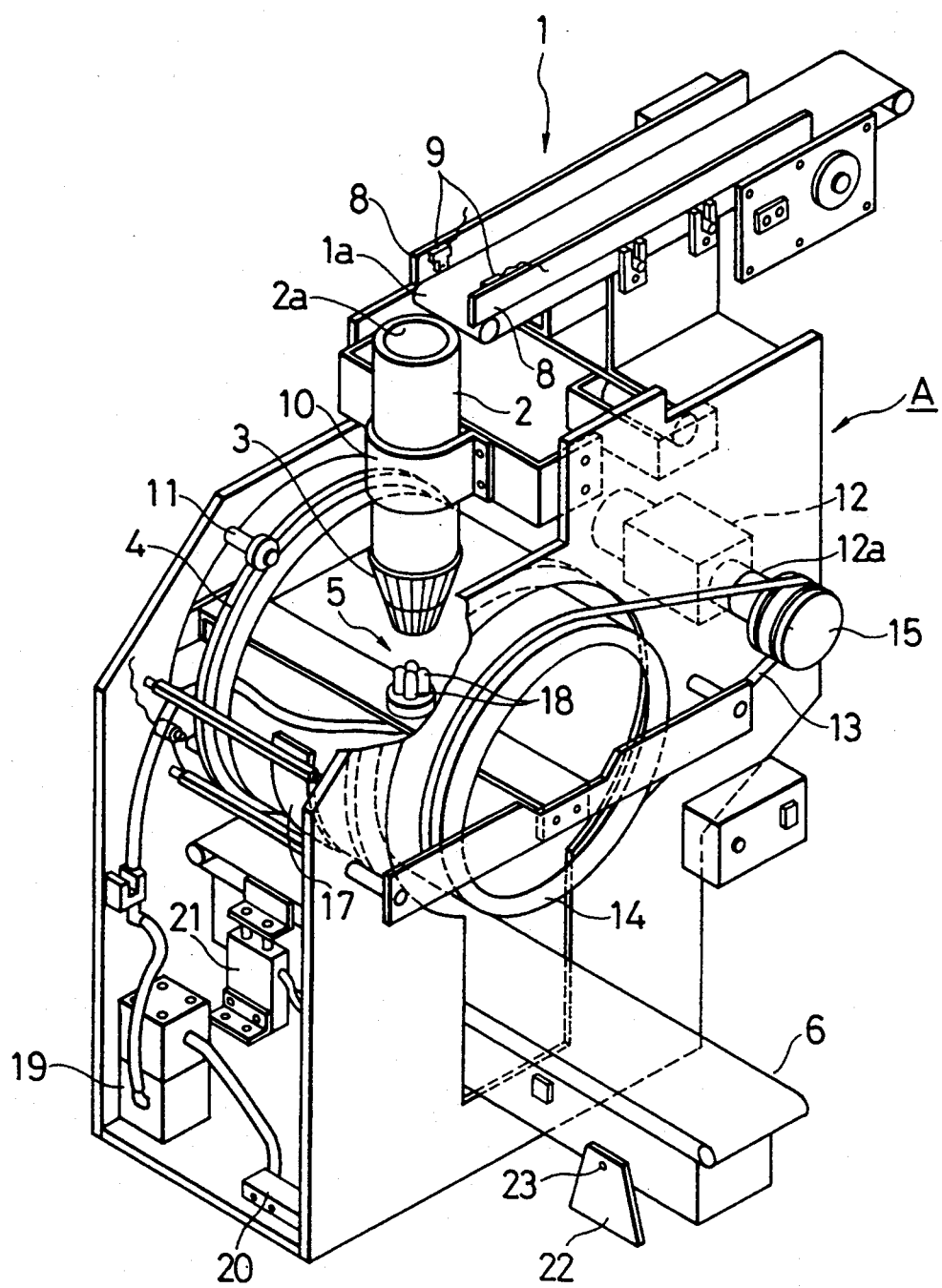
FIG. 1 is a perspective view of the first embodiment of an article orienting apparatus according to the present invention, showing overall construction of the apparatus.

Discussion will be given herebelow with respect to the first embodiment of an article orienting apparatus, according to the present invention and as shown in FIGS. 1 to 11 of the drawings. It should be appreciated that the shown embodiment is particularly suitable for orienting articles that have one open end and a closed end, such as caps and the like.

At first, brief discussion will be given for the overall construction of the first embodiment of the article orienting apparatus.

The shown embodiment of the article orienting apparatus A generally comprises a feeding belt conveyer 1, a vertical flow passage (air pipe) 2, a rotary body (rotary drum) 4, on which is provided a plurality of article receptacle sections (cap receptacle pockets) 3, a pressurized fluid injecting section 5, a transporting belt conveyer 6 and a controller 7.

In the above-mentioned article orienting apparatus A, the articles (cap) B to be oriented are fed into the air pipe 2 from the feeding belt conveyer 1 in random fashion. Within the air pipe 2, the caps B are generally directed to uniform direction (generally directing the opening ends of the caps B upwardly) by an upward air flow as an upwardly flowing fluid injected from the pressurized fluid injecting section 5. During the condition where the caps B are regulated the attitude to be directed in essentially the uniform direction, and the caps are received within the cap receptacle pockets 3. Then, by means of the rotary drum 4, the caps B within the cap receptacle pockets 3 are transferred to the transporting belt conveyer 6 in reversed attitude (directing the opening end of the caps B downwardly) and thus transported to a predetermined location.

Next, discussion will be given for the detailed construction of the first embodiment of the article orienting apparatus of FIG. 1.

The feeding belt conveyer 1 is arranged at upper rear end position of the article orienting apparatus A in substantially horizontal condition and has a feeding outlet 1a extended to the upper front portion of the article orienting apparatus A at a position above the upper end opening portion 2a of the air pipe 2 for feeding the caps B into the air pipe 2 through the upper end opening portion 2a. On the side walls 8 of the feeding outlet 1a, is provided a sensor 9 for detecting the cap B. When the sensor 9 detects the cap B, the controller 7 stops the feeding belt conveyer 1 after expiration of a predetermined period of time (after feeding of the corresponding cap B into the air pipe 2), on the basis of a detection signal. In the shown embodiment, the sensor 9 comprises an optical sensor including a light emitting element and a photo sensitive element. However, it should be appreciated that any appropriate sensors other than optical sensor, such as a micro-switch, can be employed in place of the optical sensor.

The air pipe 2 has essentially elliptic cross section and is fixed in essentially vertically oriented position, at the upper position of the article orienting apparatus A in the vicinity of the front end by means of an essentially U-shaped fixture 10. The size (lengths of longer and shorter axes) of the air pipe 2 is selected so as to permit free rotation of the caps B therewithin for orienting or changing the attitude in the upwardly directed air flow.

The cap receptacle pockets 3 are formed in mesh-like structures for permitting the upwardly air flow from the pressurized fluid injecting section 5 to pass therethrough. A plurality (8 in the example of FIG. 2) of cap receptacle pockets 3 are received within the rotary drum 4 in concaved fashion and are circumferentially arranged at essentially regular intervals. The position of each cap receptacle pocket 3 is circumferentially shifted according to rotation of the rotary drum 4 so to be oriented with the lower opening end 2b of the air pipe 2 (see FIG. 2) to receive the oriented or attitude regulated article through the lower end opening portion 2b.

The rotary drum 4 is provided at a front upper portion of the article orienting apparatus A a free rotation bearing member 11. The rotary drum 4, is provided with rotational driving torque by a motor 12 through a clutch, and a brake and a timing belt 13.

At one axial end of the rotary drum 4, a driven pulley 14 is provided for co-rotation therewith. On the other hand, the motor 12 with the clutch and brake has a drive shaft 12a carrying a driving pulley 15 at the tip end thereof. The driven pulley 14 and the driving pulley 15 are drivingly connected by means of the timing belt 13 which is wrapped therearound. The driving torque of the motor 12 with the clutch and the brake is thus transmitted to the driven pulley 14 for rotatingly driving the latter with the rotary drum 4.

In a predetermined position of the article orienting apparatus A opposing to the inner periphery of the rotary drum 4, a proximity sensor 16 (see FIG. 2) is provided. The proximity sensor 16 is designed to detect angular displacement of the rotary drum 4 in the clockwise direction in a magnitude of 45°. The motor 12 with the clutch and the brake is designed to be intermittently driven by the controller 7 on the basis of a detecting signal of the proximity sensor 16. The motor 12 with the clutch and the brake is controlled by the controller 7 on the basis of detecting a signal from the proximity sensor 16 and will be stopped after driving the rotary drum 4 for 45° of angular displacement, then again energized at a given interval. The motor 12 repeats this sequence of operation.

At a predetermined position of the outer periphery of the rotary drum 4, there is provided a cap fall preventing guide 17 arranged for covering the cap receptacle pocket 3. The cap fall preventing guide 17 is adapted to prevent the caps B within the cap receptacle pockets 3 from falling off the pockets during transfer process to the transporting belt conveyer 6.

The pressurized fluid injecting portion 5 has a multipoint type air nozzle 18 arranged generally at the rotational center in the rotary drum 4, a pressure regulator device 19 (electric-pneumatic converter) for regulating flow rate and pressure of the air flow directed upwardly depending upon the configuration, size and so forth of the cap B, and an electromagnetic valve 20 for shutting off the upwardly directed air flow. The pressurized fluid injecting portion 5 is designed to inject the air flow into the air pipe 2 via the cap receptacle pocket 3. In the illustrative embodiment, the pressure regulator 19 comprises an electropneumatic air regulator model EN40-1B available from Tokyo Automatic Control K.K., Japan. The electromagnetic valve 20 is connected to an accumulator through a pipe (not shown) and is designed to be opened for a predetermined period of time under control of the controller 7 when the sensor 9 detects the cap B.

The transporting belt conveyer 6 is arranged at the front lower position of the article orienting apparatus A and immediately below the rotary drum 4. The transporting belt conveyer 6 extends in a direction perpendicular to the direction of the feeding belt conveyer 1 (extending in the axial direction of the rotary drum 4) for transporting the caps B transferred from the cap receptacle pockets 3. The transporting belt conveyer 6 is supported so that it can be raised or lowered or moved at side of one end (the side positioned generally just below the rotary drum 4) by an air cylinder 21. On the other hand the transporting belt conveyer 6 is rockably supported on a support base 22 via a supporting shaft 23 for rocking motion thereabout. The air cylinder 21 is designed to be operated under the control of the controller 7 on the basis of detecting signals of an upper extreme limit switch 24 detecting the upper extreme of the elevating motion of the one end of the transporting belt conveyer 6 and a lower extreme limit switch 25 (see FIG. 2) detecting the lower extreme of the lowering motion of the transporting belt conveyer 6.

Figure 4:
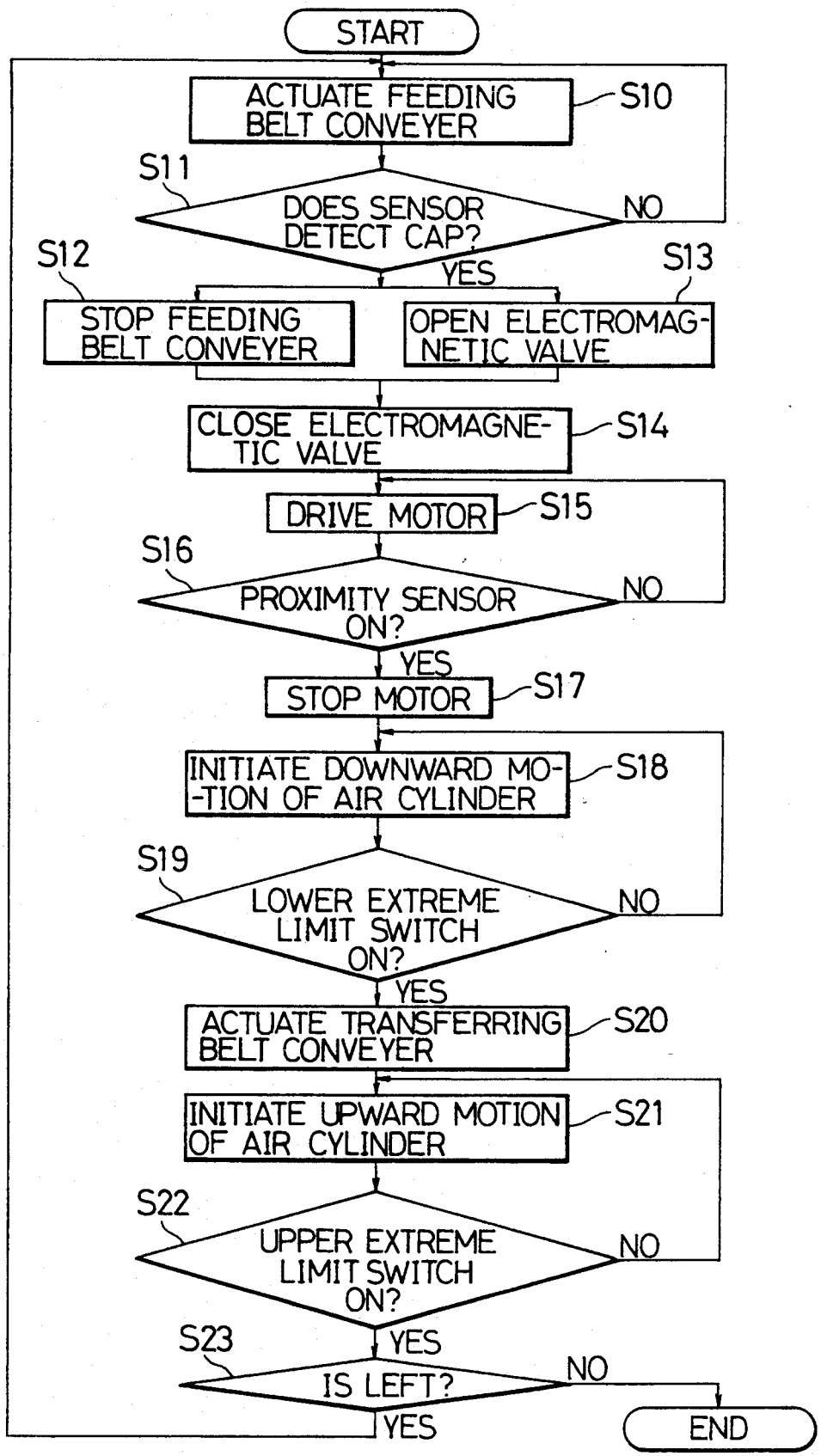
FIG. 4 is a flowchart showing process of control in the first embodiment of the article orienting apparatus.

The controller 7 comprises a microcomputer or the like, and controls the feeding belt conveyer 1, the motor 12 with the clutch and the brake, the electromagnetic value 20, the transporting belt conveyer 6 and the air cylinder 21 according to the process illustrated in the flowchart of FIG. 4.

Next, discussion will be directed to the article orienting method employing the above-mentioned article orienting apparatus A with reference to the flowchart illustrated in FIG. 4.

After putting the caps 3 on the feeding belt conveyer 1 in random fashion, a main power switch (not shown) is turned ON. Then, the controller 7 initiates control operation to execute the process of the flowchart of FIG. 4.

At first, the feeding belt conveyer 1 is actuated for transporting the cap B to the feeding outlet 1a where the sensor 9 is provided, at a step 10.

Then, judgment is made whether the sensor 9 detects the cap B at a step 11. When the cap B is detected, the feeding belt conveyer 1 is stopped after expiration of a given period in response to the detecting signal at a step 12. Also, the electromagnetic valve 20 is activated to open for a pre-set period of time at a step 13. On the other hand, the cap B detected by the sensor 9 is put into the air pipe 2.

By opening of the electromagnetic valve 20, the upwardly directed air flow with controlled flow rate and pressure by the electric-pneumatic converter 19 is introduced into the air pipe 2 through the cap receptacle pocket 3 from the nozzle 18. The air thus introduced into the air pipe 2 flows from the lower end opening portion 2b to the upper end opening portion 2a. The air flow acts on the cap B put in the air pipe 2 for regulating the attitude of the cap B.

Figure 3:
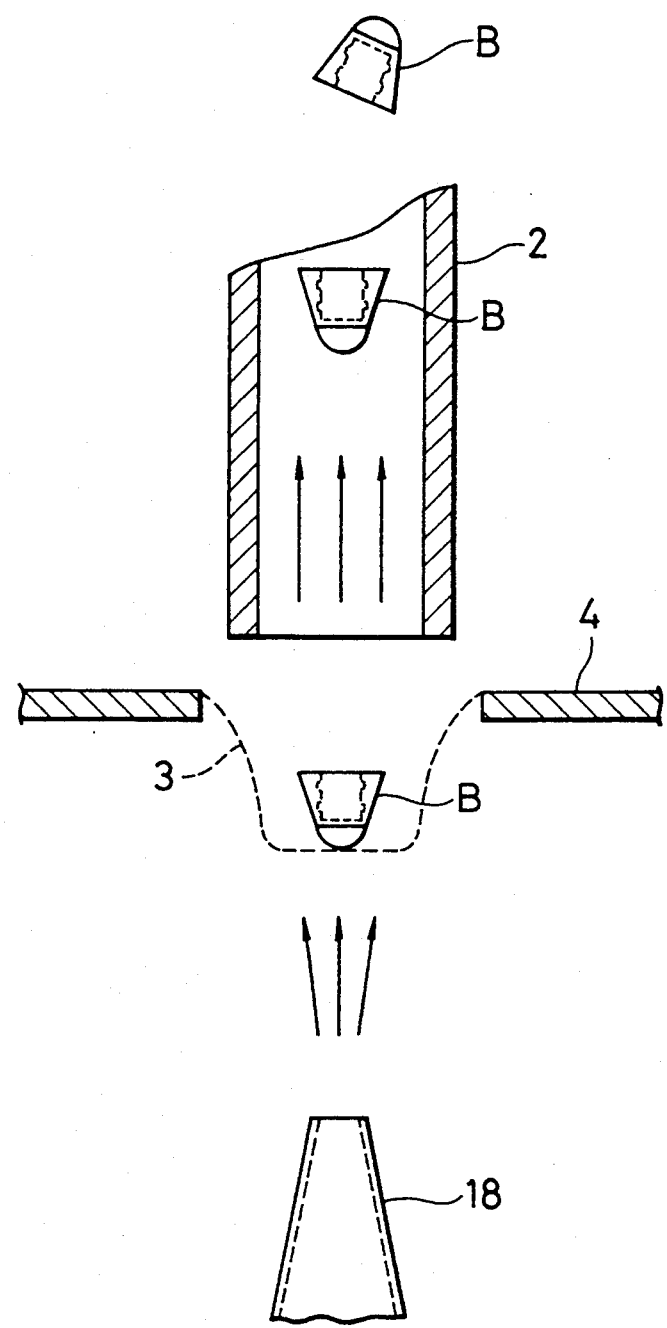
FIG. 3 is an explanatory illustration showing process of orienting the article in the first embodiment of the orienting apparatus.

As shown in FIG. 3, the cap B is stabilized in an attitude directing the opening end thereof upwardly (placing the portion where the gravity center is presented downwardly) and placed at a floating position in the stabilized attitude.

Upon expiration of the predetermined period, the electromagnetic valve 20 is closed at a step 14. Therefore, the upwardly directed air flow is terminated. Therefore, the cap B falls down into the cap receptacle pocket 3 located immediately below the lower end opening portion 2b of the air pipe 2 with maintaining the attitude directing the opening end upwardly (in a condition generally oriented in the uniform direction).

Figure 2:
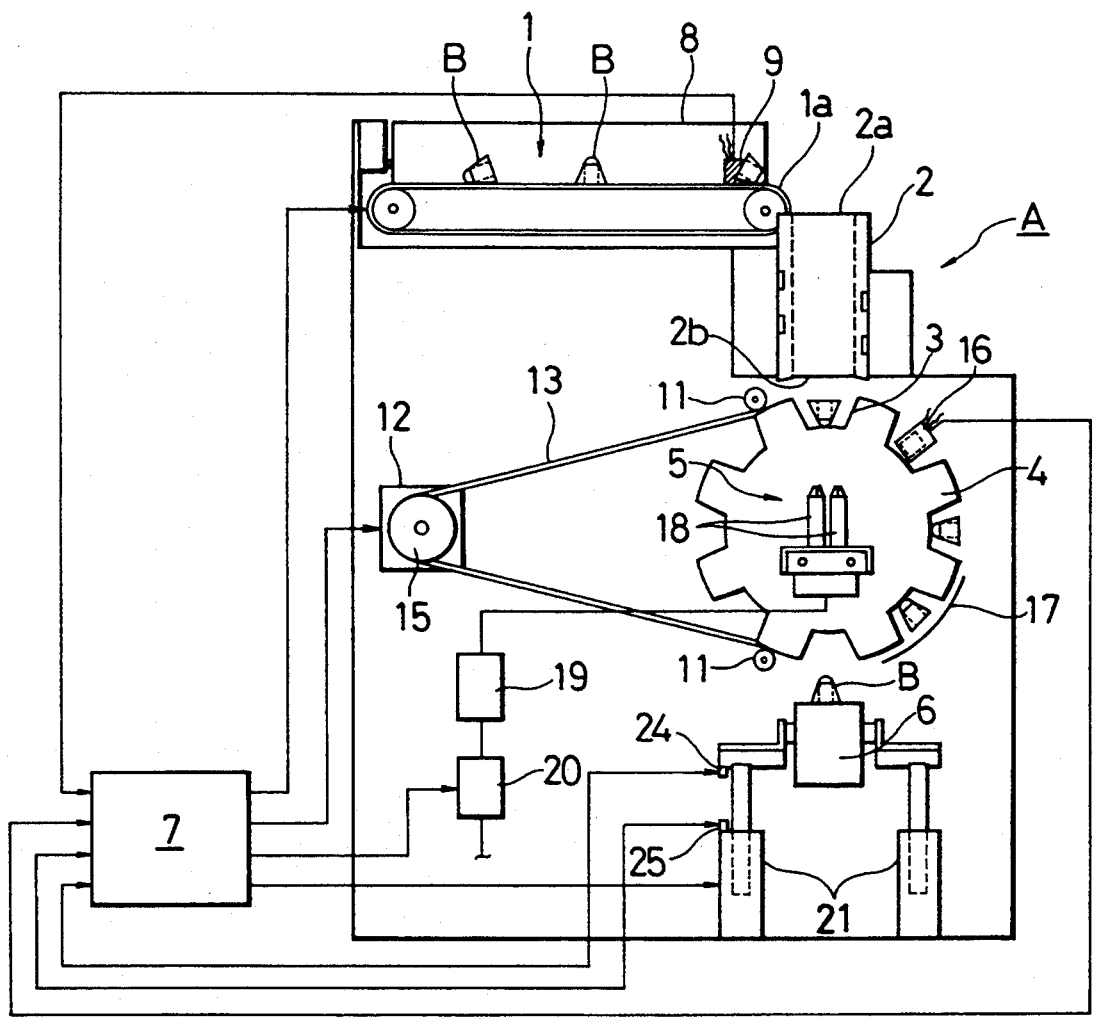
FIG. 2 is a schematic block diagram of the first embodiment of the article orienting apparatus of FIG. 1.

Then, the motor 12 with the clutch and the brake is actuated at a step 15 to drive the rotary drum 4 in the clockwise direction in FIG. 2. Then, a check is performed at a step 16 to determine whether the proximity sensor 16 turns ON (whether the rotary drum 4 completes rotation in clockwise direction for 45°) or not. When the proximity sensor 16 is turned ON, at the point where the rotary drum 4 completes the 45° of rotation, the motor 12 with the clutch and the brake is stopped at a step 17. By rotation of the rotary drum 4, the cap receptacle pockets 3 storing the cap B are shifted to the position above the transporting belt conveyer 6. At this position, the cap B is transferred from the cap receptacle pocket 3 to the transporting belt conveyer 6 with the orientation directing the opening end down. It should be appreciated that the transporting belt conveyer 6 is disposed at a tilting condition by lifting one end by the air cylinder 21 at the initial state of the cap transferring process.

Thereafter, the air cylinder 21 is actuated down the one end of the transporting belt conveyer 6, at a step 18. A check is performed as to whether the lower extreme position limit switch 25 is turned ON or not at a step 19. Upon turning ON of the lower extreme position limit switch 25, the transporting belt conveyer 6 is returned to essentially horizontal position.

Thereafter, the transporting belt conveyer 6 is driven for a given period of time, at a step 20. The cap B transferred onto the transporting belt conveyer 6 is shifted from the position to transfer the cap B from the rotary drum 4 so as not to interfere with the next and subsequent cap transferring operation.

Then, the air cylinder 21 is again actuated to lift one end of the air cylinder at the elevated position at a step 21. A check is performed as to whether the upper extreme position limit switch 24 is turned ON or not at a step 22. The one end of the transporting belt conveyer 6 is placed in close proximity of the rotary drum 4 in the elevated end of the transporting belt so that conveyer 6 may not interfere rotation thereof. By this, the transporting belt conveyer 6 is placed at the initial position ready for the next cycle of operation.

Thereafter, a check is performed as to whether the caps B are left on the feeding belt conveyer 1. When the caps are left on the feeding belt conveyer 1, the process is returned to the step 10 for repeating the foregoing process. On the other hand, when no cap remains on the feeding belt conveyer, the article orienting apparatus A terminates operation at a step 23.

Through the process set forth above, the caps B which are fed in random fashion can be effectively oriented substantially in the uniform direction using the upwardly directed air flow, and can be taken out for transporting to other place maintaining proper orientation.

FIGS. 5 through 8 are graphs showing relationship between the pressure of the upwardly directed air flow and the certainty of orientation of the caps.

In the illustrative example, the length of the air pipe 2 is 200 mm, the longer axis length of the air pipe 2 is 60 mm, the shorter axis length of the air pipe 2 is 50 mm, a distance (clearance) between the cap receptacle pocket 3 and the lower end opening portion 2b of the air pipe 2 is 6 mm, a distance between the air nozzle 18 and the lower end opening portion 2b of the air pipe 2 is 105 mm, a depth of the cap receptacle pocket 3 is 40 mm, and the air supply pressure to the pressure regulator 19 is 5.5 Kgf/cm$^2$.

Figure 5:
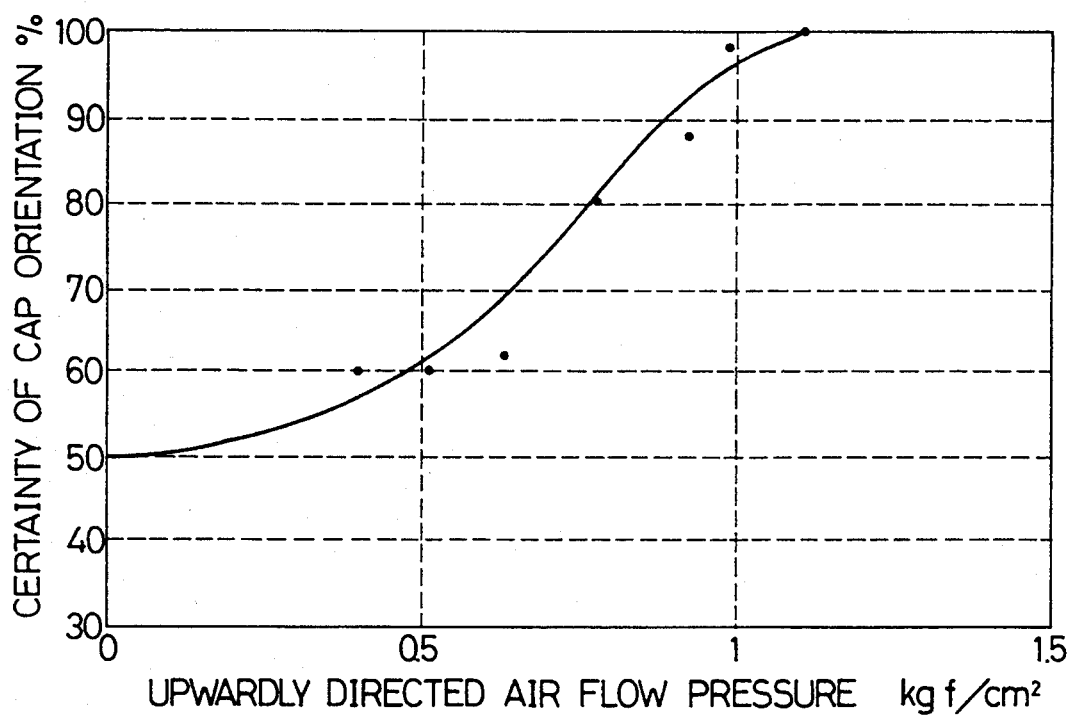
FIGS. 5, 6 and 7, and 8 are graphs showing relationship between pressure of upward air flow and a cap orienting certainty.
Figure 9A:
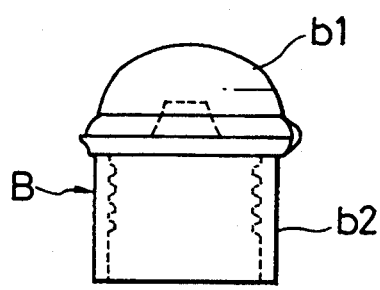
FIG. 9(a) is a front elevation of a cap B to be oriented.
Figure 9B:
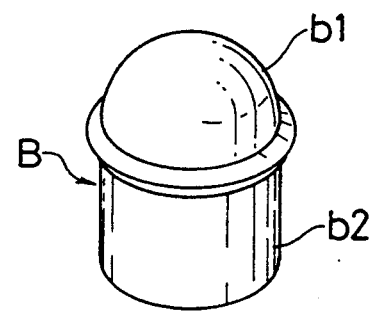
FIG. 9(b) is a perspective view of the cap B of FIG. 9(a)

The graph in FIG. 5 shows the result of orienting operation performed for the cap B having a semi-spherical head portion b1 and a cylindrical body portion b2 as shown in FIGS. 9(a) and 9(b). Here, the weight of the cap was 8.13 g.

As can be seen from the results shown in the graph, when the pressure of the upwardly directed air flow is increased, certainty of orientation is increased, and the certainty of orientation of the caps becomes 100% at a orienting pressure of 1.10 kgf/cm$^2$.

Figure 6:
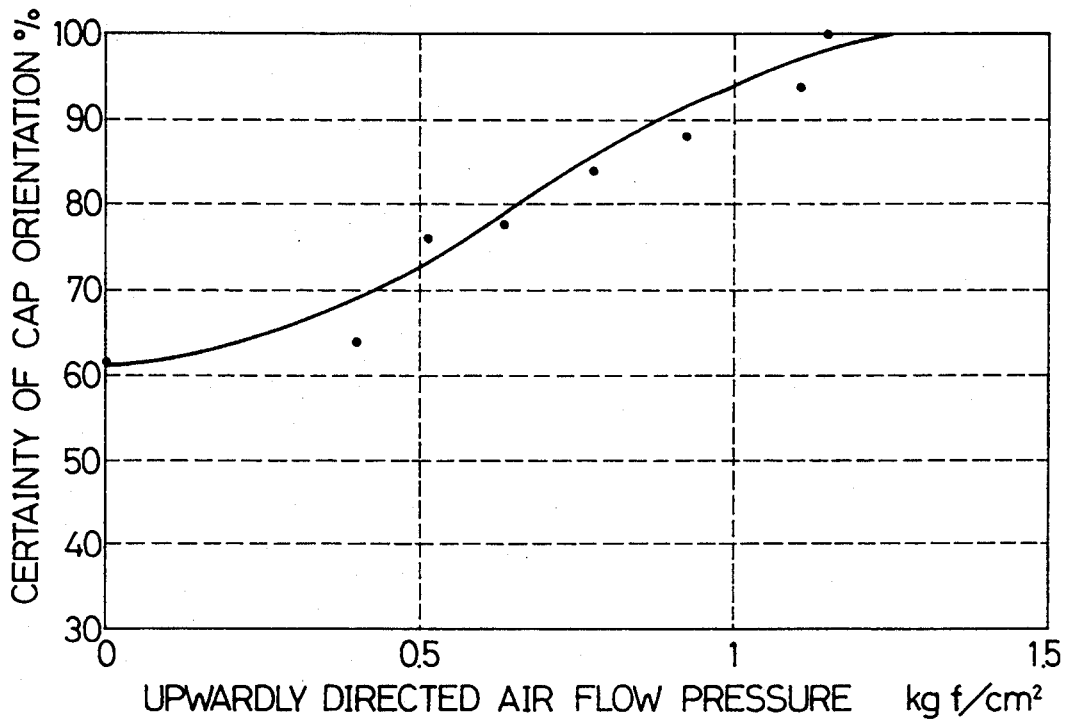

FIG. 6 shows the results of orientation for the cap having the same configuration to that illustrated in FIGS. 9(a) and 9(b). Here, the weight of the cap B was 10.73 g.

As can be seen from the results shown in the graph, when the pressure of the upwardly directed air flow is increased, certainty of orientation is increased, and the certainty of orientation of the caps becomes 100% at a orienting pressure of 1.14 kgf/cm$^2$.

Figure 7:
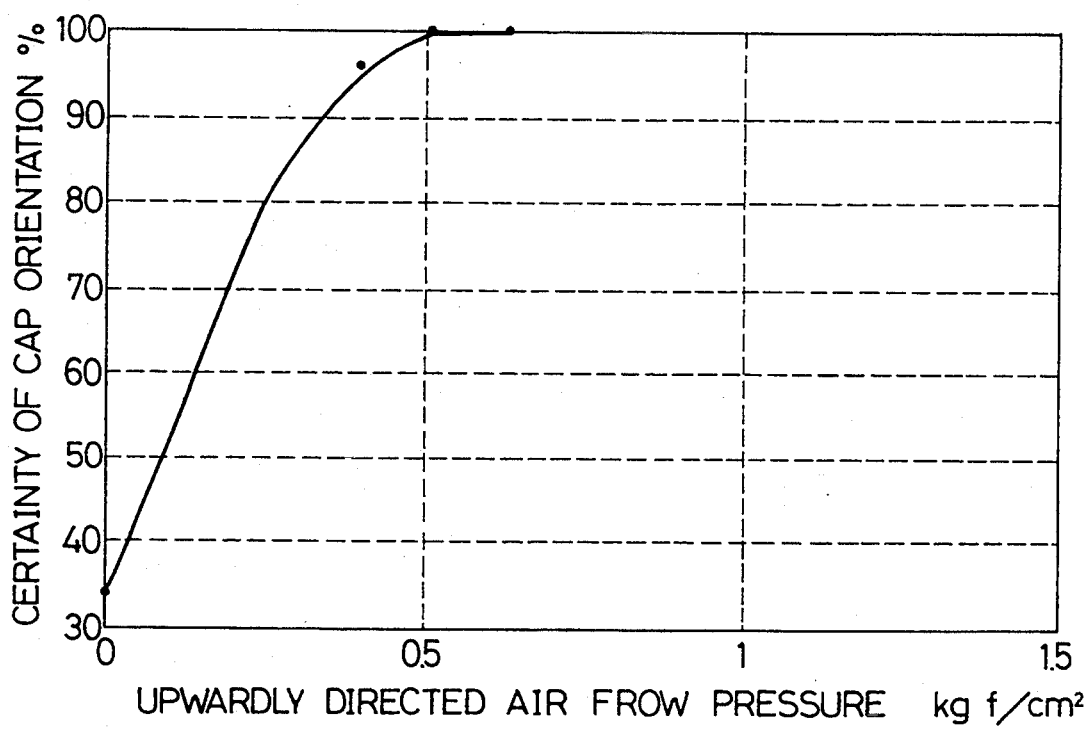
Figure 10A:
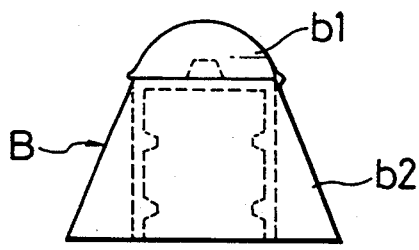
FIG. 10(a) is a front elevation of another configuration of the cap B to be oriented.
Figure 10B:
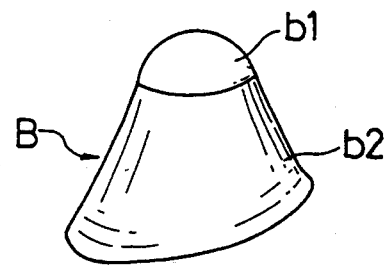
FIG. 10(b) is a perspective view of the cap B of FIG. 10(a)

FIG. 7 shows a graph of the results of orientation for the cap B having a semi-spherical head b1 and an elliptic conico-cylindrical body b2 as shown in FIGS. 10(a) and 10(b). The weight of the cap B was 8.77 g.

As can be seen from the results shown in the graph, when the pressure of the upwardly directed air flow is increased, certainty of orientation is increased, and the certainty of orientation of the caps becomes 100% at a orienting pressure of 0.51 kgf/cm$^2$.

Figure 8:
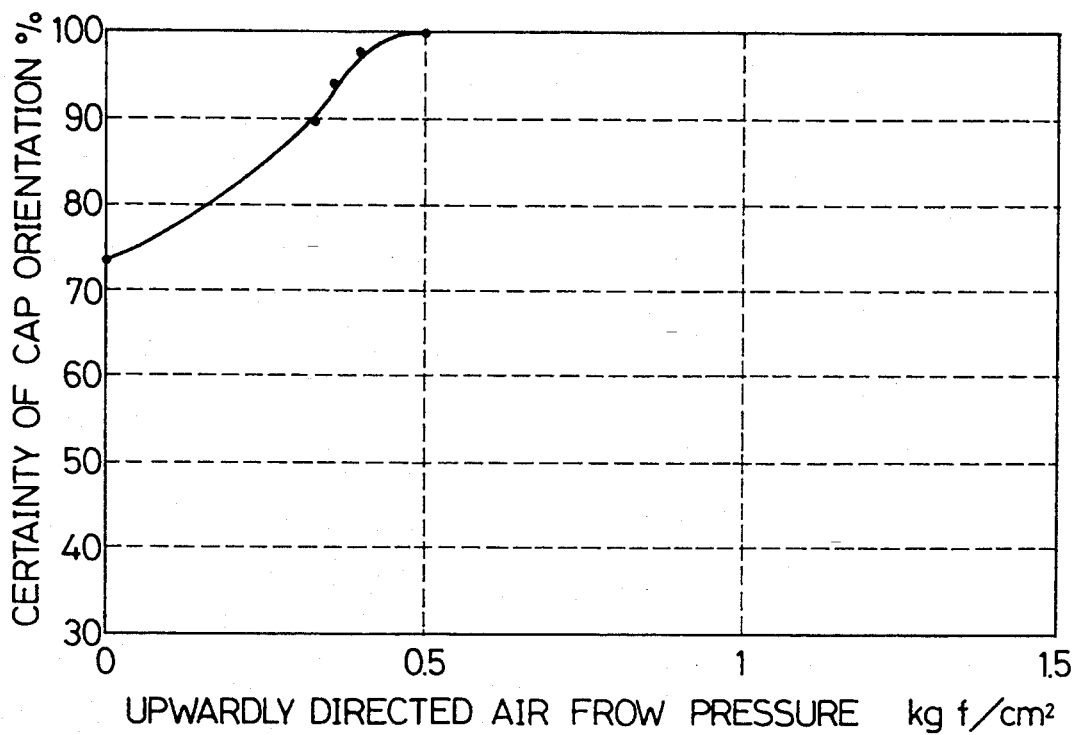
Figure 11A:
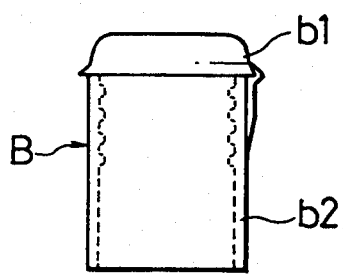
FIG. 11(a) is a front elevation of a further configuration of the cap B to be oriented.
Figure 11B:
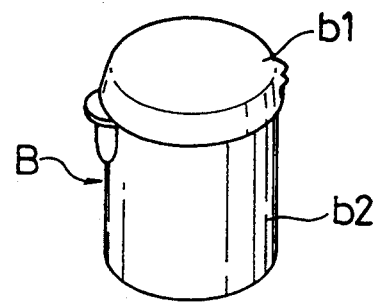
FIG. 11(b) is a perspective view of the cap B of FIG. 11(a)

FIG. 8 shows a graph of the results of orientation for the cap B having a substantially disc shaped heads b1 and a cylindrical body b2, as shown in FIG. 11(a) and 11(b). The weight of the cap B was 6.11 g.

As can be seen from the results shown in the graph, when the pressure of the upwardly directed air flow is increased, certainty of orientation is increased, and the certainty of orientation of the caps becomes 100% at a orienting pressure of 0.51 kgf/cm$^2$.

It should be appreciated that the term "orientating pressure" represents the pressure of the upwardly directed air flow at which the caps B are oriented and received within the cap receptacle pocket 3 with a 100% certainty through 50 cycles of experimental operation.

Figure 12:
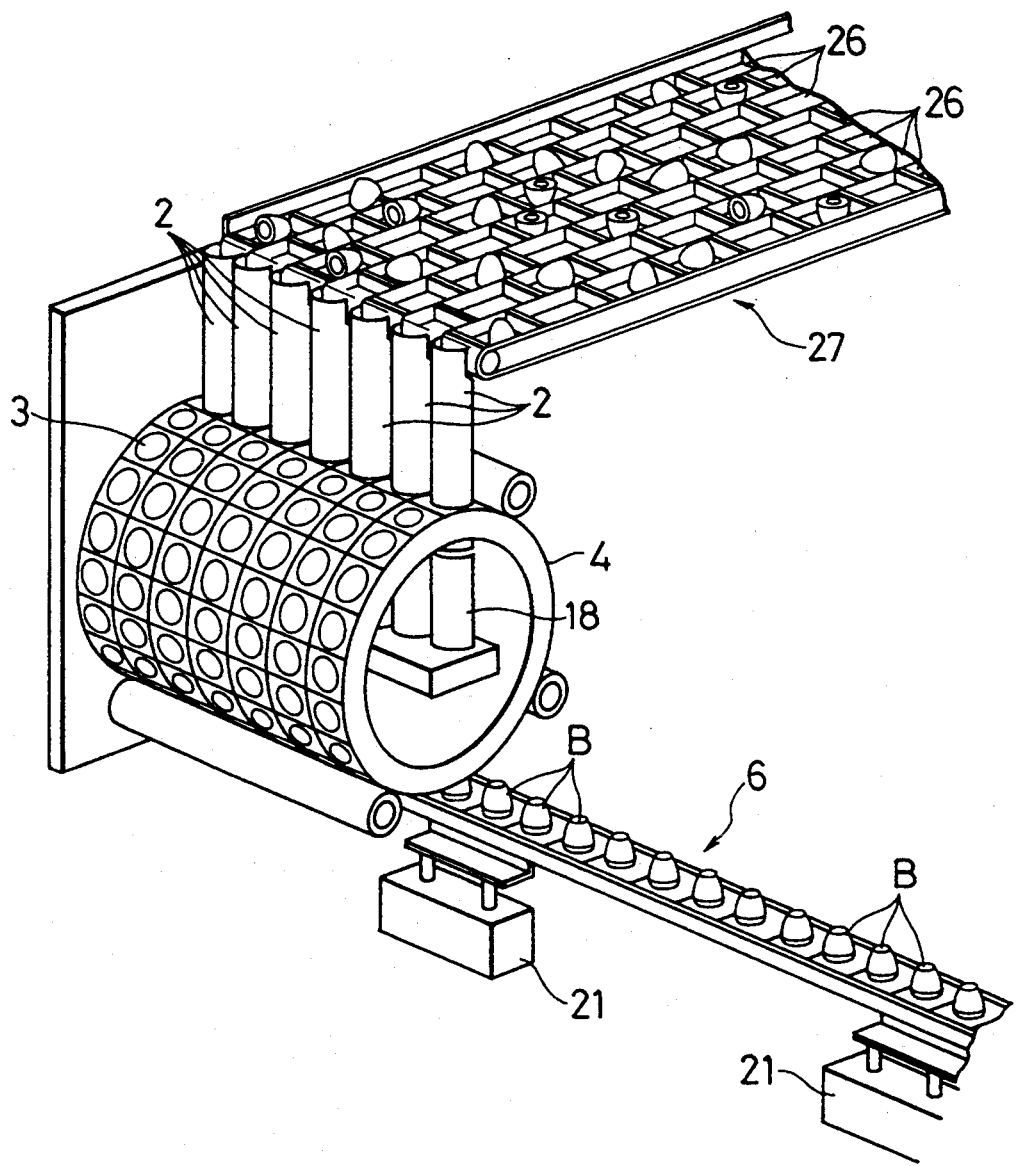
FIG. 12 is a perspective view of the second embodiment of the article orienting apparatus according to the present invention.

FIG. 12 is a perspective view of the second embodiment of the article orienting apparatus A according to the present invention. It should be noted that like elements to those in FIGS. 1 through 4 will be represented by the same reference numerals and the detailed discussed therefor is omitted for simplicity of disclosure.

The shown embodiment is directed the article orienting apparatus A with improved orienting efficiency for the caps B (number of caps B oriented within a unit time).

Namely, a feeding belt conveyer 27 with a plurality of belt conveyers 26 (seven in the shown case) is provided. The respective of the belt conveyers 26 are designed to have a clutch and a brake operable independently of those of other belt conveyers. A plurality of air pipes 2 and the rotary drums 4 are provided in vertical alignment with the feeding outlets of respective belt conveyers 26 of the feeding belt coveyer 27 and in mutually parallel relationship with each other. Within the rotary drum 4, a plurality of air nozzles 18 are provided in alignment with respective of the air pipes 2. With the shown construction, a plurality of oriented caps B can be obtained through one cycle of orienting operation. It should be noted that, in the shown embodiment, since the length of the transporting conveyer 6 is increased, the one end of the transporting conveyer 6 is supported by a plurality of air cylinders 21.

It should be noted that the present invention is not specified to the foregoing embodiments. Particularly, the present invention is not specified for orienting the caps B but can be applied for orientation of various articles.

Also, while the foregoing embodiment has been illustrated in the case where the upward air stream is terminated after orienting the cap B in the substantially uniform direction, it is equally possible to decelerate the upward air stream instead of stopping the stream.

On the other hand, the air pipe 2 providing the vertical flow path is not specified as to elliptic configuration as set forth above and can be of any appropriate configuration, such as circular cross section, square or rectangular cross section.

Furthermore, the cap receptacle pocket 3 is not always required to be mounted on outer periphery of the rotary drum 4 and can be directly mounted on a horizontal conveyer, for example.

Also, the air nozzle 18 need not be a multi-point nozzle but can be single point nozzle. Furthermore, the configuration of the tip end of the air nozzle 18 is not specified and can be any appropriate configuration.

In addition, the pressure regulator 19 for adjusting the flow rate and pressure of the upwardly directed air flow is not specified with respect to the electric-pneumatic converter and can be any appropriate device which has capability of adjustment of flow rate and pressure of the air flow.

Furthermore, the process of control for the article orienting apparatus A is not limited to the specific process as discussed with respect to the flowchart of FIG. 4.

The third embodiment of the cap aligning and feeding apparatus 110 is designed to regulate the attitude of each of caps 101 for transferring to a cap transfer member 111. The cap transfer member 111 receives the oriented caps 101 and transfers to a cap application apparatus in the next step.

Figure 15A:
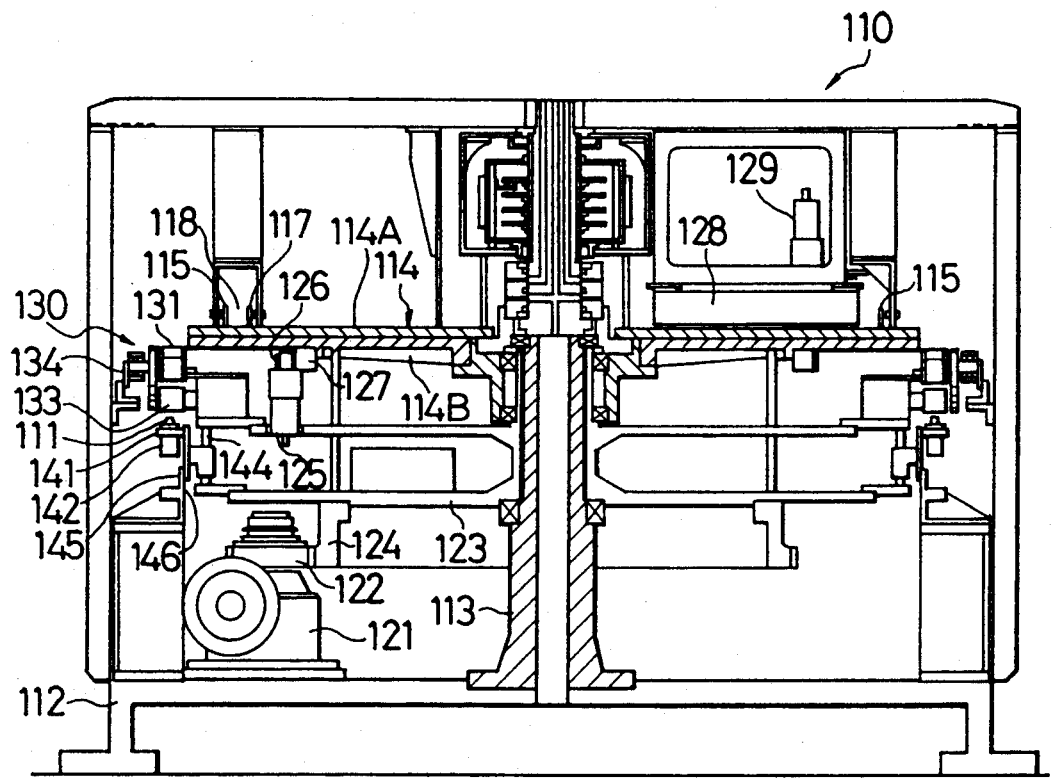
FIGS. 15(a) and 15(b) are fragmentary illustration showing a cap supply apparatus in the third embodiment of the invention.
Figure 15B:
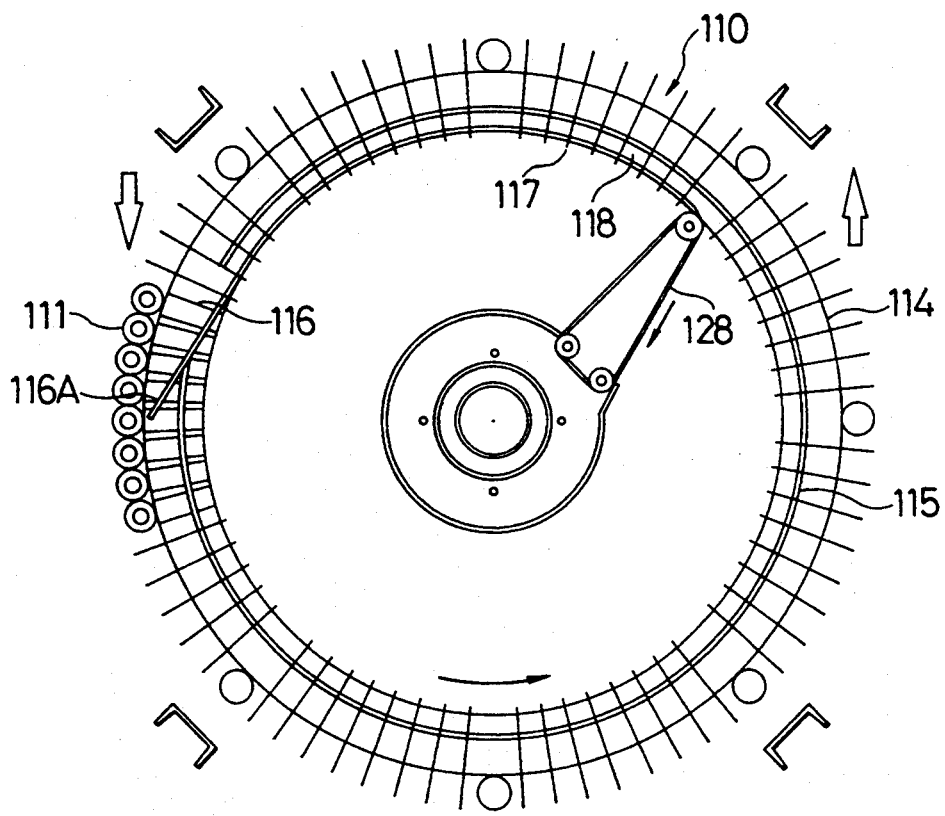

The cap aligning and feeding apparatus 110 has a base 112 supporting a central post 113. The center post 113 supports a rotary table 114. An outer guide 115 is fixedly provided on the upper surface of the rotary table 114 in the vicinity of the outer peripheral edge thereof. The outer guide 115 extends most circumference of the rotary table 114. A plurality of cap receptacle grooves 116 are formed on the upper surface of the rotary table 114. Each of the cap receptacle grooves 116 extends radially across the outer guide 115. An inner guide 117 is fixedly provided radially inside of the outer guide 115. The inner guide 117 extends substantially in parallel to the outer guide 115 and only in a part of the overall circumference. The inner guide 117 defines a cap feeding out passage 118 together with the outer guide 115. It should be appreciated that the cap receptacle grooves 116 are defined between adjacent projections of respective of table components 114A and 114B which form the rotary table 114. The projections of respective table components 114A and 114B are arranged alternatively so that each pair of projections of the table components forms a land for defining the cap receptacle groove 116 together with the adjacent pair of projections forming adjacent land. With the construction set forth above, a large number of caps 101 are put within an essentially circular space defined by the outer guide 115 on the rotary table 114. The cap aligning and feeding apparatus 110 receives respective one of the caps 101 in the circular space on the rotary table 114 in each of the cap receptacle grooves 116 in a random attitude. According to rotation of the rotary table 114, the cap 101 held in each of the cap receptacle groove 116 reaches the inlet of the cap feeding out passage 118 and is fed thereinto. By further rotation of the rotary table 114, the cap 101 within the cap feeding out passage 118 travels along the passage as maintained within the cap receptacle groove 116. As can be seen from FIG. 15, a cap pushing out guide 116A is provided as an extension of the inner guide 117 and extends to the outer peripheral edge of the rotary table 114 in oblique relative position with respect to the radius. The cap 101 in the cap receptacle groove 116 is thus pushed outwardly by the cap pushing out guide 116A and is thus fed to a cap orienting apparatus 130 which will be discussed later.

The cap aligning and feeding apparatus 110 has a motor 121 which has an output shaft carrying a driving gear 122. The driving gear 122 is meshed with a gear 124 fixed onto an intermediate table 123. Another motor 125 is provided on the intermediate table 123. The output shaft of the motor 125 carries a gear 126 which is meshed with a gear 127 fixed to the rotary table 114. With such construction, the shown embodiment of the cap aligning and feeding apparatus 110 drives the motor 121 with maintaining the motor 125 in stopped condition for rotatingly driving the rotary table 114 and the intermediate table 123 in unison. When the motor 125 is driven, the lower table component 114B causes slight angular displacement relative to the upper table component 114A. Such relative displacement between the upper and lower table components 114A and 114B permits variation of the intervals between adjacent radial projections and to vary the width of the cap receptacle groove 116 depending upon the size of the caps 101 to be received. At this time, a gap is formed between the projection of the table component 114A and the projection of the table component 114B forming the above-mentioned land, due to relative angular displacement between the projections. However, it should be noted that the gap thus formed is relatively small in relation to the size of the cap 101. Therefore, the cap 101 may not enter into the gap.

Furthermore, the cap aligning and feeding apparatus 110 is provided with a cap jamming prevention belt 128 at a position corresponding to the inlet of the cap feeding out passage 118 on the rotary table 114. The cap jamming prevention belt 128 is driven by a motor 129 and carries the caps 101 which are not received within the cap receptacle grooves 116 toward the center of the rotary table 114 and this prevents the caps 101 from jamming at the inlet of the cap feeding out passage 118.

As set forth above, the cap aligning and feeding apparatus 110 has the cap pushing out guide 116A extending substantially in a straight line to the outer circumference of the center rotary table 114, at the cap feeding out position defined at the outlet side of the cap feeding out passage 118. The cap pushing out guide 116A radially pushes the cap within corresponding cap receptacle groove 116 reaching the outlet side of the cap feeding out passage 118, outwardly according to rotation of the rotary table 114 and thus feeds to a passage forming body 131 of the cap orienting apparatus 130. It should be noted that the cap receptacle groove 116 lies horizontal or provides lowering gradient toward the outer periphery of the rotary table 114.

Hereafter will be given a discussion for the third embodiment of the cap orienting apparatus 130 of the present invention.

The cap orienting apparatus 130 is provided at a plurality of positions around the intermediate table 123 so that the number of the cap orienting apparatus 130 directly corresponds to the number of the cap receptacle grooves 116 on the rotary table 114. Each cap orienting apparatus 130 comprises the passage forming body 131, an upwardly directed fluid flow generating device 132, a cap holding member 133, a reversing device 134 and a cap transfer member 111.

The passage forming member 131 comprises a cylindrical body rigidly secured on the intermediate table 123. The cylindrical passage member 131 defines a vertical passage 131A which permits the cap 101 to pass therethrough with capability of free rotation.

The upwardly directed fluid flow generating device 132 is constructed by connecting a pressurized air piping to an air flow passage 132A provided in the cap holding member 133 for generating upwardly directed fluid flow within the vertical passage 131A defined within the passage forming member 131. It should be appreciated that when the upwardly directed fluid flow generating device 132 forms the upwardly directed flow of the pressurized air, the negative pressure generated around the lower end opening portion of the passage forming member 131 draws the air therearound to cause laminar flow of the upwardly directed fluid flow across overall area of the vertical passage 131A. The resultant laminar flow of the upwardly directed fluid flow contributes for assuring orientation of the cap 101.

The cap holding member 133 is supported on the intermediate table 123 so as to be placed below the passage forming member 131 in alignment therewith and defines a recessed holding surface 133A, to which the air flow passage 132A opens. It should be noted that the supporting shaft 133B of the cap holding member 133 is supported on the intermediate table 123 in rotatable fashion so that it may be reversed by means of the reversing device 134. The cap holding means 133 is designed to maintain the cap 101 which is oriented in substantially uniform direction with the upwardly directed fluid flow within the vertical passage 131A of the passage forming member 131, with vacuum drawing and release, by terminating vacuum drawing.

It should be noted that the cap holding member 133 is designed so that the air flow passage 132A can be selectively connected to the pressurized air piping and the vacuum pressure piping via the electromagnetic valve.

The reversing device 134 includes a reversal arm 134A pivotally mounted on the intermediate table 123 for pivotal movement about a supporting shaft 134B. A gear 136 is fixed to the supporting shaft 134B. The gear 136 meshes with a gear 137 fixed to a supporting shaft 133B of a cap holding member 133. The reversal arm 134A is further provided with a cam follower 134C. The cam follower 134C engages with a reversing cam 139 located adjacent the outer periphery of the intermediate table 123 and is supported by a circumferential post 138 extending from the base 112. The reversing cam 139 drives the cam follower 134C so as to rotate the cap holding member 133 from a vertically oriented position to the 180° rotated reversed position and is then returned to the vertical position while the intermediate table 123 rotate for one turn. It should be appreciated that the gear ratio of the gears 136 and 137 is selected to be 2:1 so that the cap holding member 133 can be rotated for 180° with 90° of pivotal movement of the reversal arm 134A.

The cap transferring member 111 is provided with a projecting receptacle surface 111A to receive the cap 101 from the cap holding member 133 oriented at the reversed position by means of the reversing device 134. Specifically, at the reversed position of the cap holding member 133, where the cap 101 held on the cap holding member 133 is placed in alignment with the projecting receptacle surface 111A, the supply of vacuum pressure is shut off to terminate drawing force exerted on the cap 101. As a result, the cap 101 falls down on the projecting receptacle surface 111A to maintained the reversed orientation.

It should be noted that the cap transferring member 111 is transferred to a transferring member holding station 141 of the cap orienting apparatus 130 from an infeed system and is again transferred to a discharge system from the transferring member holding station 141. The transferring member holding station 141 is provided with a positioning magnet assembly 142 for precisely positioning the cap transferring member 111. The positioning magnet assembly 142 interacts with a magnet 143 incorporated in the cap transferring member 111 for drawing to each other to enable positioning of the cap transferring member 111 in coaxial and vertically aligned position with respect to the cap holding member 133.

On the other hand, the transferring member holding station 141 of the cap orienting apparatus 130 is supported on a hollow guide 144 fixedly mounted on the intermediate table 123. The transferring member holding station 141 is provided with a cam follower 145. Opposing the cam follower 145, an elevating cam 146 is provided adjacent the outer circumference of the intermediate table 123 and supported on the base 112. The cam 146 and cam follower 145 enables driving of the transferring member holding station 141 up and down. By this, the cap transferring member 111 on the transferring member holding station 141 can approach to the recessed holding surface 133A of the cap holding member 133 to assure secure transfer of the cap 101 therebetween.

Next, discussion will be given for process of attitude control for the cap 101 by means of abovementioned third embodiment of the cap orienting apparatus 130.

(1) At the upstream of the cap feeding out position of the cap aligning and feeding apparatus 110, the cap transferring member 111 is transferred to the transferring member holding station 141 of the cap orienting apparatus 130 and is held thereon.

(2) The air flow passage 132A of the cap holding member 133, which air flow passage acts as the upwardly directed fluid flow generating device, is connected to a pressurized air piping to form upwardly directed fluid flow of the compressed air in the vertical passage 131A of the passage forming body 131.

Figure 13A:
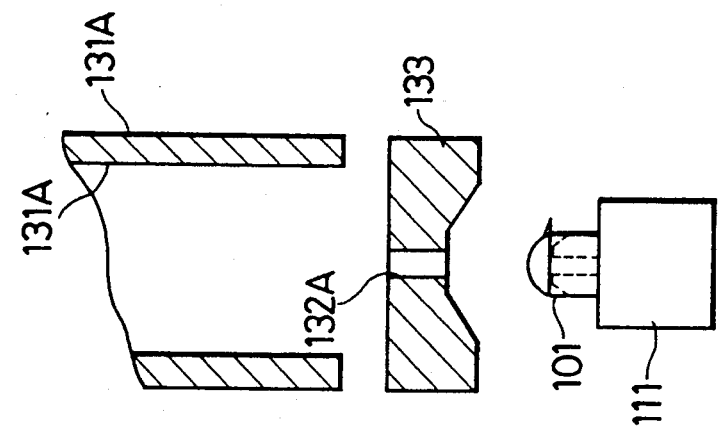
FIGS. 13(a) to 13(d) are fragmentary illustrations showing method of orienting the articles in the third embodiment of the present invention.

(3) The cap 101 held on the cap receptacle groove 116 on the rotary table 114 is fed out through the feeding out passage 118 and by means of the pushing out guide 116A. The cap 101 is thus fed into the vertical passage 131A defined in the passage forming body 131. In synchronism with the timing of throwing the cap into the vertical passage 131A, the electromagnetic valve or any equivalent device for controlling air flow through the vertical passage, is opened to form the upwardly directed air flow with a desired or controlled pressure, through the vertical passage 131A. Therefore, cap 101 regulates the attitude to direct the side where the gravity center is present, downwardly, in other words, directing to the open end upwardly placed in the floating condition. (see FIG. 13(a))

Figure 13B:
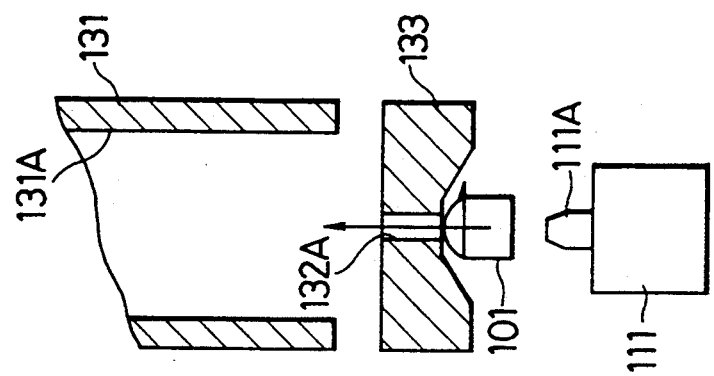

(4) After expiration of a predetermined period of time, by switching of the electromagnetic valve or the like, the upwardly directed air flow through the vertical passage 131A is terminated. At the same time, the air flow passage 132A of the cap holding member 133 is connected to the vacuum pressure piping. With termination of the upwardly directed air flow through the vertical passage 131A, the cap 101 is released from the floating condition and thus falls down on the recessed holding surface 133A of the cap holding member 133. For the cap 101 on the cap holding surface 133A, the vacuum pressure introduced through the air flow passage 132A acts to effect vacuum drawing to firmly holding the cap 101 thereon. (see FIG. 13(b))

Figure 13C:
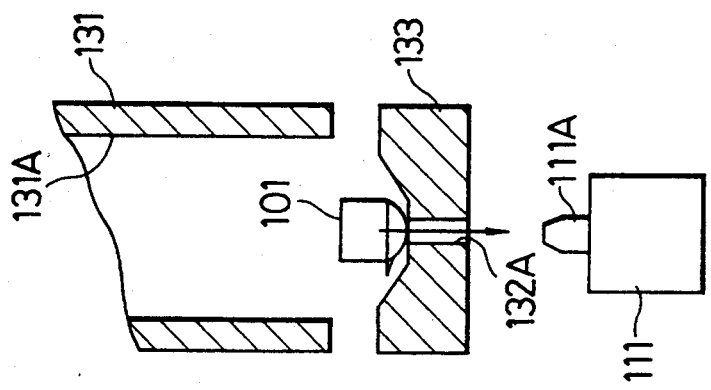

(5) By means of the reversing device 134, the cap holding member 133 is reversed over 180°. (see FIG. 13(c)).

Figure 13D:
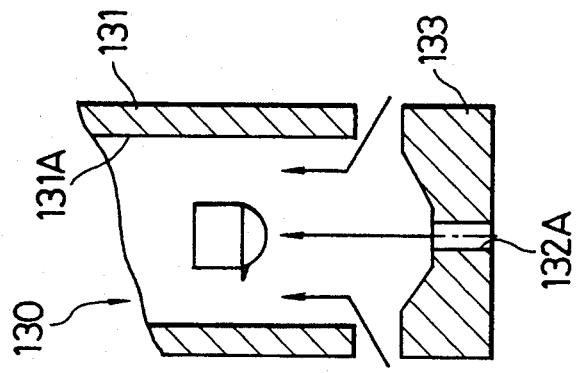
Figure 14A:
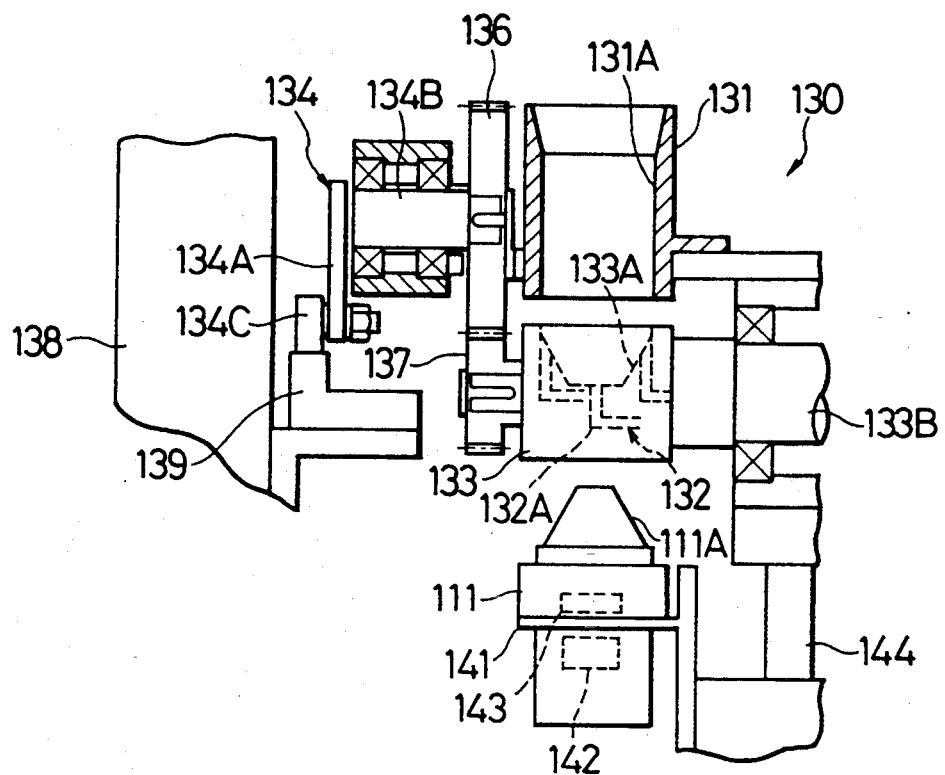
FIGS. 14(a) and 14(b) are fragmentary illustrations of major parts of the third embodiment of the article orienting apparatus.
Figure 14B:
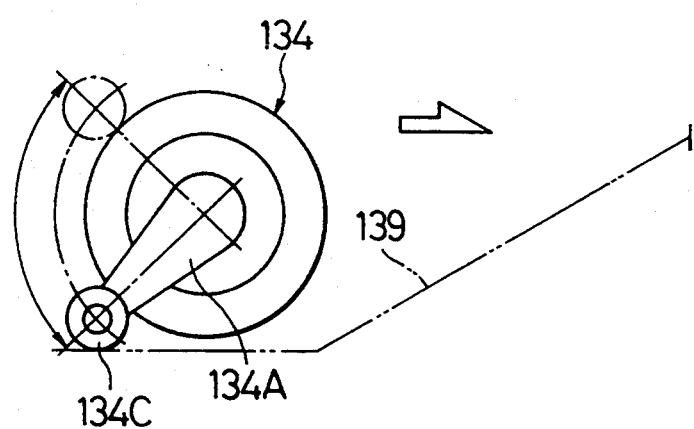

(6) Then, supply of the vacuum pressure is terminated to release the vacuum drawing force on the cap 101. Thus, the cap 101 held on the cap holding surface 133A falls down to the cap transferring member 111. In the alternative, it may be possible to supply the pressurized air through the air flow passage 132A for assuring releasing of the cap 101 from the cap holding surface 133A. (see FIG. 13(d))

Operation of the foregoing embodiment will be discussed herebelow.

(1) The caps 101 which are fed in random attitude or position, are oriented in substantially uniform direction while they are held in floating condition by the effect of the upwardly directed pressurized air flow, and stabilized at the regulated attitude. By termination or reduction of the upwardly directed air flow, the caps 101 falls vertically with maintaining the regulated attitudes. Then, the cap 101 is held on the cap holding member 133 by effecting of vacuum drawing.

(2) Thereafter, the cap holding member 133 holding the cap 101 is reversed. Subsequently, the vacuum pressure is released to permit the cap 101 to fall down from the cap holding member 133 and to be transferred to the cap transferring member 111 with reversed regulated attitude.

While the present invention has been discussed in terms of the preferred embodiments of the invention, it is obvious to those skilled in the art to incorporate any modification of the detailed elements or omission without departing from the spirit of the invention. Therefore, the present invention should be understood to include all possible modification, changes, omission and addition of detailed elements or combination of the elements which can be implemented without departing from the principle of the invention which is set out in the appended claims.

For instance, the following modifications are obviously encompassed within the scope of the present invention.

(1) The upwardly directed fluid flow generating device can be constructed with a pressurized air discharge nozzle formed separately from the article holding station in place of the air flow passage in the cap holding member in the shown embodiment.

(2) Although the shown embodiment employs the common passage for introducing the pressurized air for forming as the upwardly directed fluid flow forming and the vacuum pressure for retaining the article, it is, of course possible to provide separate passages for introduction of the pressurized air and the vacuum pressure.

(3) The article drawing means in the article holding station can be magnetic drawing instead of vacuum drawing. In such case, it becomes necessary to provide magnetically conductive body in the article to be secured magnetically.

(4) The flow rate and pressure of the upwardly directed fluid flow formed by the upwardly directed fluid flow generating means may be adjustable depending upon the size and weight of the articles to be oriented.

As set forth above, according to the present invention, the articles which is fed in random attitude can be regulated in the attitude using the upwardly directed fluid flow and can be fed out from the apparatus with maintaining the regulated attitude.

What is claimed is:

1. A method for orienting an article having a shape open at one end and closed at the other end, the method comprising the steps of:

putting the article into an upwardly directed fluid flow moving in a horizontally rotating path;

terminating or decelerating the upwardly directed fluid flow after orienting the article in a substantially predetermined direction;

drawing the oriented article onto an article holding station by a drawing force;

reversing the article holding station while maintaining the drawing of the oriented article; and releasing the drawing force for transferring the article in the reversed oriented condition to an article transferring member by moving one end of the article transferring member to receive said article.

2. An apparatus for orienting an article, the apparatus comprising:

a horizontal rotary disk having an outer circumference;

a passage forming body defining a vertical passage for passing the article while permitting free rotation therein, the passage forming body fixed relative to the outer circumference of the rotatable rotary disk;

means for generating an upwardly directed fluid flow within the vertical passage of the passage forming body;

an article holding station disposed on the rotary disc and located below the passage forming body, for drawing the article by a drawing force, the article oriented in a substantially predetermined direction through the vertical passage of the passage forming body;

means for reversing the article holding station; and means for receiving the reversed oriented article from the article holding station.

3. The article orienting apparatus as set forth in claim 2, wherein the article is a cap having one end opened and the other end closed, and the upwardly directed fluid flow is an upwardly directed air flow.

4. An apparatus for orienting a cap having a shape open at one end and closed at the other end, the apparatus comprising:

a vertical passage for passing the cap while permitting free rotation therein;

a vertically rotating body;

a cap receptacle station located below the vertical passage and disposed on the periphery of said vertically rotating body for receiving the cap while the cap is oriented in a substantially predetermined direction in the vertical passage;

a pressurized air injecting station provided below the cap receptacle station for injecting pressurized air into the vertical passage; and means for receiving the cap in the cap receptacle station.

* * * * *